(12) United States Patent
Cheng et al.

(10) Patent No.: US 9,148,831 B2
(45) Date of Patent: Sep. 29, 2015

(54) GPS-ASSISTED CELL SELECTION FOR MOBILE DEVICES

(75) Inventors: Steven D. Cheng, San Diego, CA (US); Kuo-Chun Lee, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 842 days.

(21) Appl. No.: 12/270,947

(22) Filed: Nov. 14, 2008

(65) Prior Publication Data

US 2010/0124924 A1    May 20, 2010

(51) Int. Cl.
  *H04W 36/00* (2009.01)
  *H04W 64/00* (2009.01)
  *H04W 36/36* (2009.01)

(52) U.S. Cl.
  CPC .......... *H04W 36/0083* (2013.01); *H04W 36/36* (2013.01); *H04W 64/00* (2013.01); *H04W 36/0061* (2013.01)

(58) Field of Classification Search
  CPC ................. H04W 36/00–36/34; H04W 64/00
  USPC ........................ 455/434, 435.1, 436, 437, 440
  See application file for complete search history.

(56) References Cited

U.S. PATENT DOCUMENTS

| | | | |
|---|---|---|---|
| 7,065,361 | B1 | 6/2006 | Fortuna |
| 2004/0152480 | A1 | 8/2004 | Willars et al. |
| 2006/0270407 | A1 | 11/2006 | Hidaka |
| 2007/0021121 | A1* | 1/2007 | Lane et al. ................. 455/441 |
| 2008/0031194 | A1 | 2/2008 | Yaqub |
| 2008/0076398 | A1 | 3/2008 | Mate et al. |
| 2008/0186882 | A1 | 8/2008 | Scherzer et al. |
| 2008/0227463 | A1* | 9/2008 | Hizume et al. ............. 455/456.1 |
| 2009/0003279 | A1* | 1/2009 | Abusch-Magder et al. .. 370/331 |

(Continued)

FOREIGN PATENT DOCUMENTS

| | | |
|---|---|---|
| CN | 101087472 A | 12/2007 |
| EP | 1081974 A2 | 3/2001 |
| EP | 1379013 A1 | 1/2004 |

(Continued)

OTHER PUBLICATIONS

International Search Report—PCT/US2009/064339—ISA/EPO—Feb. 24, 2010.

(Continued)

*Primary Examiner* — Larry Sternbane
(74) *Attorney, Agent, or Firm* — Tyler J. Overall

(57) ABSTRACT

Methods and apparatus for using a location of a mobile station (MS) and information about neighbor base stations (BSs) to assist network entry and initialization, scanning, and/or handover operations are provided. The location of the MS may be ascertained by determining the Global Positioning System (GPS) coordinates of the MS internally or by receiving the location from, e.g., a GPS device external to the MS. The information about neighbor BSs may be retrieved from a BS information database based on the location of the MS. The BS information database may reside within the MS, be broadcast periodically to the MS in an effort to update the MS's internal database, or be stored in the network operator's database. Knowledge of the MS's location and information about neighbor BSs may reduce the time spent during network entry, scanning, or handover, and thereby, power consumption; and may increase the bandwidth usage efficiency.

44 Claims, 12 Drawing Sheets

(56) References Cited

U.S. PATENT DOCUMENTS

| | | |
|---|---|---|
| 2010/0069070 A1 | 3/2010 | Shi |
| 2010/0118847 A1 | 5/2010 | Lee et al. |

FOREIGN PATENT DOCUMENTS

| | | |
|---|---|---|
| JP | 2002027519 A | 1/2002 |
| JP | 2002164919 A | 6/2002 |
| JP | 2003519997 A | 6/2003 |
| JP | 2006505201 A | 2/2006 |
| JP | 2006060295 A | 3/2006 |
| JP | 2006254063 A | 9/2006 |
| KR | 20060013058 A | 2/2006 |
| KR | 100617593 B1 | 9/2006 |
| KR | 20070038408 A | 4/2007 |
| WO | 0150788 A1 | 7/2001 |
| WO | WO-2004043098 A1 | 5/2004 |
| WO | WO2006117587 A1 | 11/2006 |
| WO | WO-2006131977 A1 | 12/2006 |
| WO | WO-2007148911 A1 | 12/2007 |
| WO | 2008084621 A1 | 7/2008 |
| WO | WO-2008112255 A2 | 9/2008 |

OTHER PUBLICATIONS

Taiwan Search Report—TW098138621—TIPO—Sep. 18, 2013.
Taiwan Search Report—TW098138621—TIPO—Feb. 26, 2013.
Written Opinion—PCT/US2009/064339—ISA/EPO—Feb. 24, 2010.
Co-pending U.S. Appl. No. 12/211,859, filed Sep. 17, 2008.
Ray S.K., et al., "Hybrid predictive base station (HPBS) selection procedure in IEEE 802.16e-based WMAN", Telecommunication Networks and Applications Conference, 2007. ATNAC 2007. Australasian, IEEE, Piscataway, NJ, USA, Dec. 2, 2007, pp. 93-98, XP031356860, ISBN: 978-1-4244-1557-1.
Taiwan Search Report—TW098138621—TIPO—Jun. 17, 2014.

* cited by examiner

| LOCATION (602) | BSID (604) | PRIVILEGE (606) | FREQUENCY (608) | STANDARDS RELEASE (610) | RAT (612) |
|---|---|---|---|---|---|
| $L_1$ | $BS_1$ | $P_1$ | $F_1$ | $R_1$ | $RAT_1$ |
| ... | ... | ... | ... | ... | ... |
| $L_n$ | $BS_n$ | $P_n$ | $F_n$ | $R_n$ | $RAT_n$ |

GPS-ASSISTED CELL SELECTION FOR MOBILE DEVICES

TECHNICAL FIELD

Certain embodiments of the present disclosure generally relate to wireless communication and, more particularly, to using a location of a mobile station (MS) and information about neighbor base stations to assist network entry and initialization, scanning, and/or handover operations.

SUMMARY

Certain embodiments of the present disclosure generally relate to using a location of a mobile station (MS) and information about neighbor base stations to assist network entry and initialization, scanning, and/or handover operations.

Certain embodiments of the present disclosure provide a method for determining one or more neighbor base station (BS) candidates for an MS to scan or handover. The method generally includes, based on a location of the MS, retrieving information from a BS information database about one or more nearby base stations; based on the information, selecting one or more neighbor BS candidates from the one or more nearby base stations; and scanning at least one of the neighbor BS candidates.

Certain embodiments of the present disclosure provide a mobile device. The mobile device generally includes logic for retrieving, based on a location of the mobile device, information from a BS information database about one or more nearby base stations; logic for selecting one or more neighbor BS candidates from the one or more nearby base stations based on the information; and logic for scanning at least one of the neighbor BS candidates.

Certain embodiments of the present disclosure provide an apparatus for wireless communications. The apparatus generally includes means for retrieving, based on a location of the apparatus, information from a BS information database about one or more nearby base stations; means for selecting one or more neighbor BS candidates from the one or more nearby base stations based on the information; and means for scanning at least one of the neighbor BS candidates.

Certain embodiments of the present disclosure provide a computer-program product for determining one or more neighbor BS candidates for an MS to scan or handover. The computer-program product typically includes a computer-readable medium having instructions stored thereon, the instructions being executable by one or more processors. The instructions generally include instructions for retrieving, based on a location of the MS, information from a BS information database about one or more nearby base stations; instructions for selecting one or more neighbor BS candidates from the one or more nearby base stations based on the information; and instructions for scanning at least one of the neighbor BS candidates.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 6 is a table of BS information for each BS, in accordance with certain embodiments of the present disclosure.

DETAILED DESCRIPTION

Figure 1:
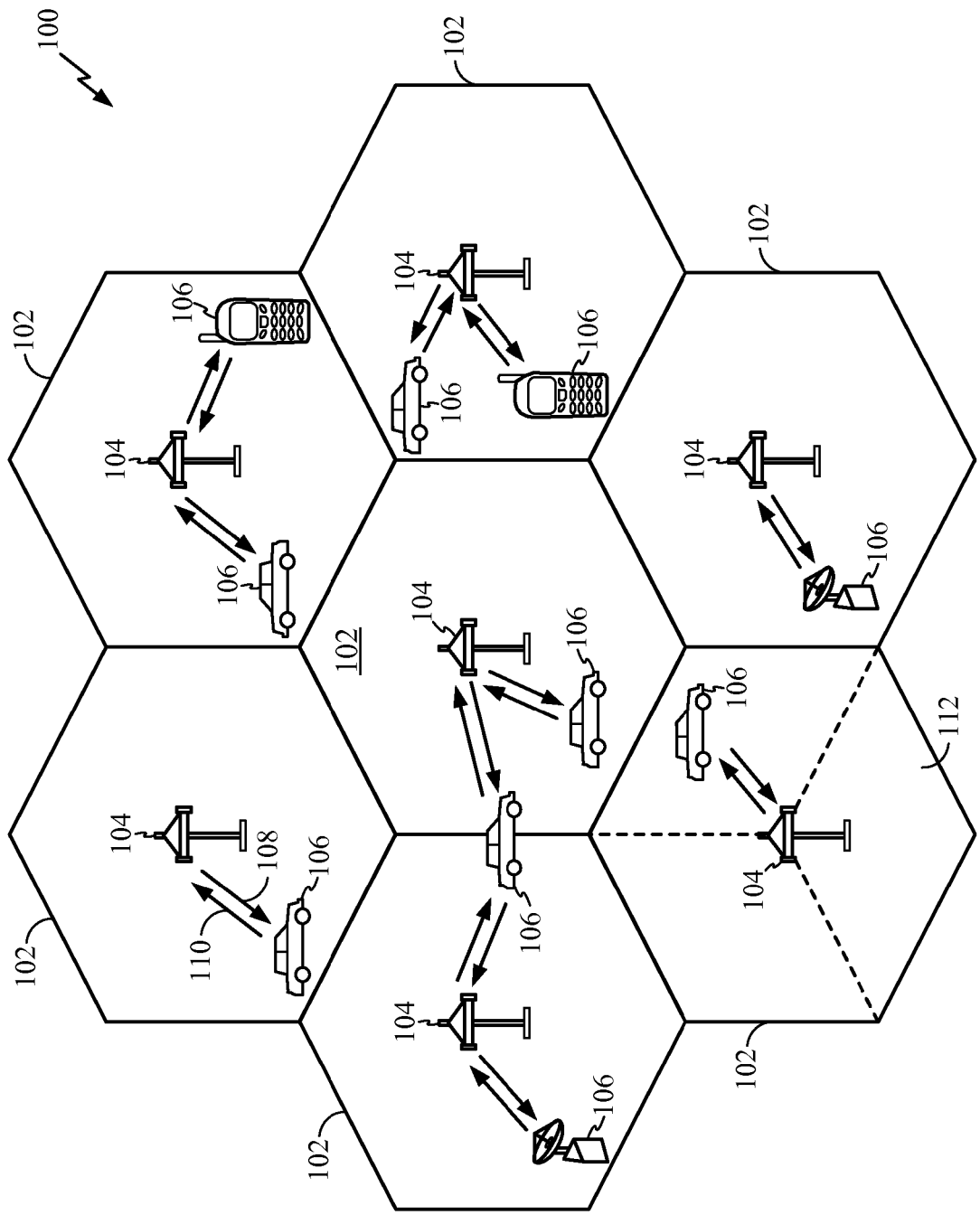
FIG. 1 illustrates an example wireless communication system, in accordance with certain embodiments of the present disclosure.

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations.

For various reasons, such as a mobile station (MS) moving away from the area covered by one base station and entering the area covered by another, a handover (also known as a handoff) may be performed to transfer communication services (e.g., an ongoing call or data session) from one base station to another. Three handover methods are supported in IEEE 802.16e-2005: Hard Handoff (HHO), Fast Base Station Switching (FBSS) and Macro Diversity Handover (MDHO). Of these, supporting HHO is mandatory, while FBSS and MDHO are two optional alternatives.

HHO implies an abrupt transfer of connection from one BS to another. The handover decisions may be made by the MS or the BS based on measurement results reported by the MS. The MS may periodically conduct an RF scan and measure the signal quality of neighboring base stations. The handover decision may arise, for example, from the signal strength from one cell exceeding the current cell, the MS changing location leading to signal fading or interference, or the MS requiring a higher Quality of Service (QoS). Scanning is performed during scanning intervals allocated by the BS. During these intervals, the MS is also allowed to optionally perform initial ranging and to associate with one or more neighboring base stations. Once a handover decision is made, the MS may begin synchronization with the downlink transmission of the target BS, may perform ranging if it was not done while scanning, and may then terminate the connection with the previous BS. Any undelivered Protocol Data Units (PDUs) at the BS may be retained until a timer expires.

When FBSS is supported, the MS and BS maintain a list of BSs that are involved in FBSS with the MS. This set is called a diversity set. In FBSS, the MS continuously monitors the base stations in the diversity set. Among the BSs in the diversity set, an anchor BS is defined. When operating in FBSS, the MS only communicates with the anchor BS for uplink and downlink messages including management and traffic connections. Transition from one anchor BS to another (i.e., BS switching) can be performed if another BS in the diversity set has better signal strength than the current anchor BS. Anchor update procedures are enabled by communicating with the serving BS via the Channel Quality Indicator Channel (CQICH) or the explicit handover (HO) signaling messages.

A FBSS handover begins with a decision by an MS to receive or transmit data from the anchor BS that may change within the diversity set. The MS scans the neighbor BSs and selects those that are suitable to be included in the diversity set. The MS reports the selected BSs, and the BS and the MS update the diversity set. The MS may continuously monitor the signal strength of the BSs that are in the diversity set and selects one BS from the set to be the anchor BS. The MS reports the selected anchor BS on CQICH or MS-initiated handover request message.

For MSs and BSs that support MDHO, the MS and BS maintain a diversity set of BSs that are involved in MDHO with the MS. Among the BSs in the diversity set, an anchor BS is defined. The regular mode of operation refers to a particular case of MDHO with the diversity set consisting of a single BS. When operating in MDHO, the MS communicates with all BSs in the diversity set of uplink and downlink unicast messages and traffic.

An MDHO begins when an MS decides to transmit or receive unicast messages and traffic from multiple BSs in the same time interval. For downlink MDHO, two or more BSs provide synchronized transmission of MS downlink data such that diversity combining is performed at the MS. For uplink MDHO, the transmission from an MS is received by multiple BSs where selection diversity of the information received is performed.

In addition to scanning for potential handover candidates due to, for example, weak signal strength of a serving BS, scanning may also be performed when an MS attempts to initially acquire a network or reacquire the network after a signal loss. The MS may begin to scan the possible channels of the downlink frequency band of operation until it finds a valid downlink signal. Once the MS has acquired a valid downlink signal from a BS, the network entry procedures may proceed with ranging, negotiation of basic capabilities, and registration as described in the IEEE 802.16 standard.

Certain embodiments of the present disclosure provide methods and apparatus for using a location of a mobile station (MS) and information about neighbor base stations to assist network entry and initialization, scanning, and/or handover operations. The location of the MS may be ascertained by determining the Global Positioning System (GPS) coordinates of the MS internally or by receiving the location from a device, such as a GPS device, external to the MS. The information about neighbor base stations may be retrieved from a base station (BS) information database based on the location of the MS. The BS information database may reside within the MS, be broadcast periodically to the MS in an effort to update the database internal to the MS, or be stored in the network operator's database. Knowledge of the location of the MS and information about neighbor BSs may reduce the amount of time spent during network entry, scanning, or handover, and thereby, power consumption; and may increase the bandwidth usage efficiency.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
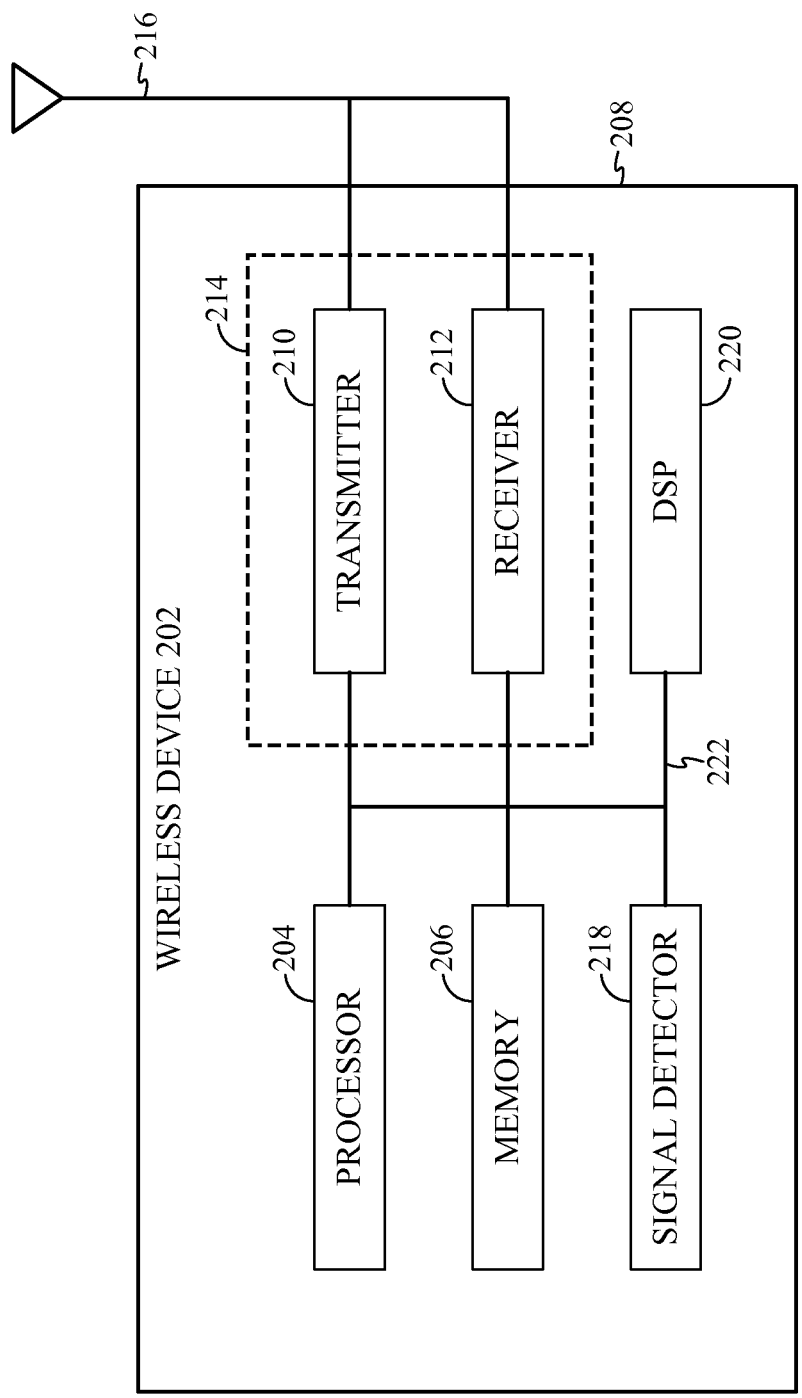
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 that controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
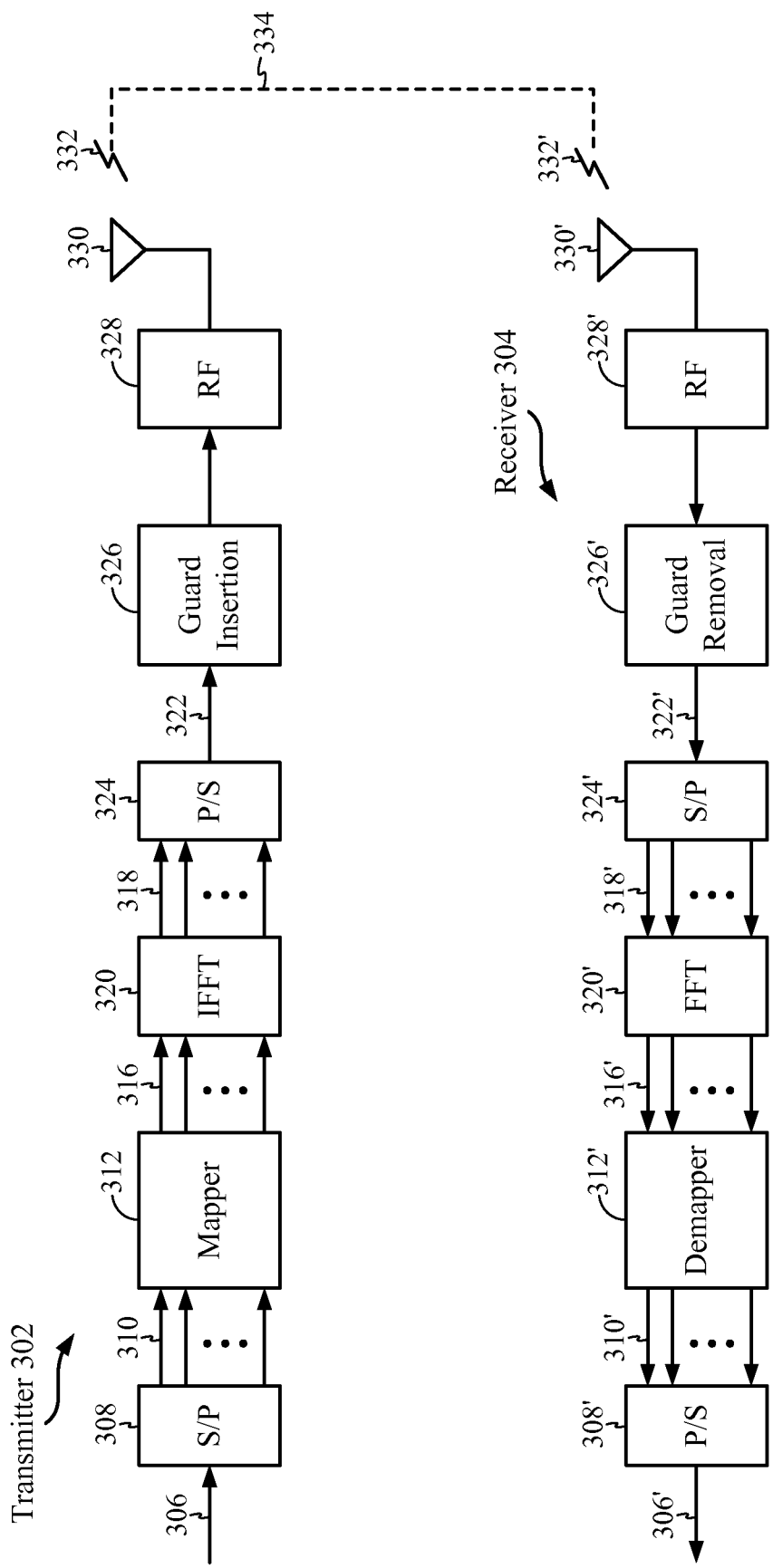
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

GPS-Assisted Cell Selection for Mobile Devices

A mobile station (MS) may be able to move from one place to another without losing the communication connectivity, and moving from one place to another may be accomplished through wireless communications protocols allowing the MS to connect with an active base station (BS). When an MS moves out of the current active BS's coverage area, a cell selection or reselection process may be initiated in an effort to find a BS to camp on, so the MS may handover from the current BS to a new BS. The cell selection or reselection process may be triggered by the network or by the MS itself. The cell selection or reselection process may be dependent upon a neighbor BS list broadcast by the network, the list typically being quite sizeable.

If the cell selection or reselection process is triggered by the network, the network may inform an MS, through a Layer 3 (L3) cell change order message, to change to a new BS based upon the measurement reports periodically provided by the MS. One of the problems for this approach is that the MS may only camp on the BSs operated by the same operator, unless the operator has a contract agreement with other operator(s), which may eliminate the chance for an MS to camp on a BS covered by a different operator. Without knowledge of the operators for each BS, there may be blind handovers. Sometimes the handover may fail, so the MS may need to regress to camping on the previous active BS and attempt handover with another BS.

If the cell selection or reselection process is triggered by an MS itself, the MS may need to periodically identify the neighbor BSs and measure their signals via scanning, for example. The measurement overhead and search time may increase when the neighbor cells belong to a different frequency, a different frequency band, or a different radio access technology (RAT), such as WiMAX, code division multiple access (CDMA) Evolution-Data Optimized (EVDO), or 1 times Radio Transmission Technology (1×RTT, or simply 1×). The MS may be dependent on the neighbor BS list broadcast by the network. In some wireless protocols, the network may support multimode, while others may only support a single mode. If the network currently supports only a single mode, then the network may only provide neighbor BS information within the same RAT despite whether the MS may be able to support different RATs. This may prevent an MS from camping on a BS supporting a different RAT that may have a stronger signal or higher Quality of Service (QoS) than other neighbor BSs supporting the same RAT in the list broadcast by the network.

An MS may use the sizeable list of neighbor BSs broadcast by the network to determine a potential serving BS for network entry, candidate neighbor BSs for potential handovers, or a neighbor BS for an actual handover. Handover failures may occur when an MS attempts to camp on a BS that may have a different standards release or subscription privilege. The MS may perform extensive processing in an effort to find the appropriate BS candidates among the neighbor BSs specified therein, thereby spending considerable time during network entry, scanning, or handover. Accordingly, it may be desirable to reduce the size of the neighbor BS list and reduce handover failure scenarios.

Figure 4:
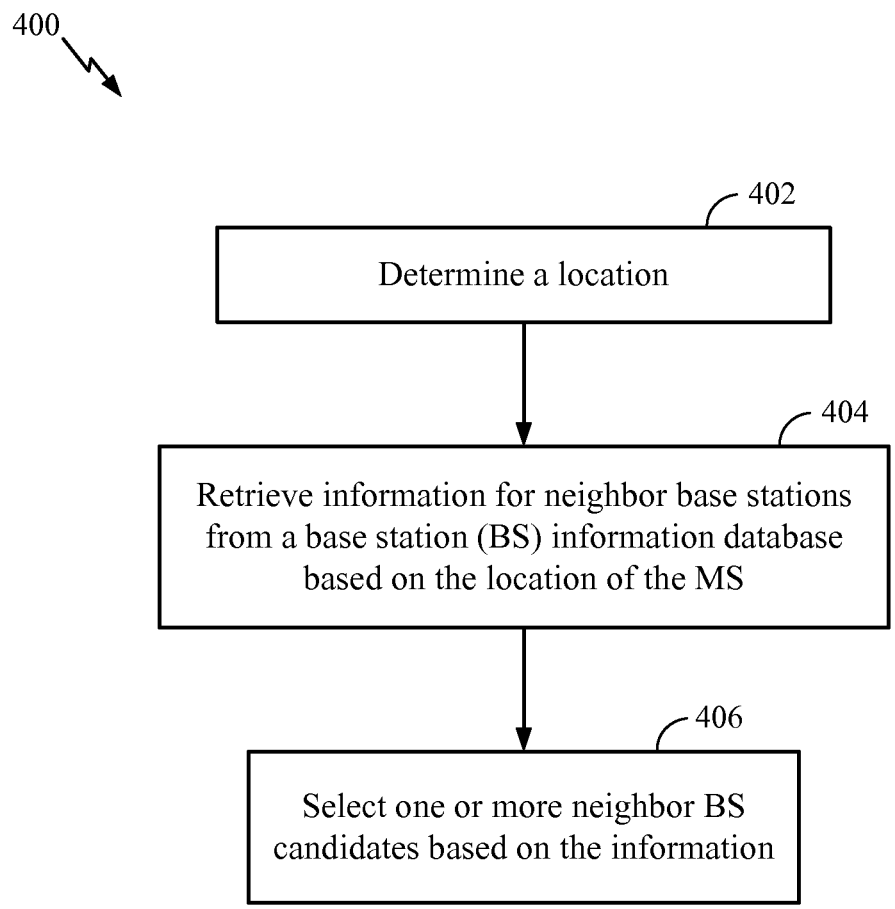
FIG. 4 is a flow diagram of example operations for determining one or more neighbor base station (BS) candidates for a mobile station (MS) to scan or handover based on information for the nearest neighbor base stations retrieved from a BS information database, in accordance with certain embodiments of the present disclosure.

FIG. 4 is a flow diagram of examples operations 400 for determining one or more neighbor BS candidates for an MS to scan or handover according to a reduced neighbor set, from the perspective of the MS. The operations 400 may begin, at 402, by determining a location of the MS. In an effort to describe the location of the MS with latitude and longitude, for example, the location may be determined using the Global Positioning System (GPS) by the MS itself (for an MS with GPS capability). For other embodiments, the MS may communicate with an external device (e.g., a vehicle navigation system, a handheld GPS device, or a laptop computer running GPS software) to determine the MS's location. Communication between the MS and the external device may be performed via a cable or over the air (OTA). Because GPS devices have an uncertainty ranging from about 3 m to about 100 m for commercial-grade (as opposed to military-grade) depending on the measurement time and other factors, the location of the MS may account for the GPS uncertainty and/or the measurement time for certain embodiments.

Figure 5:
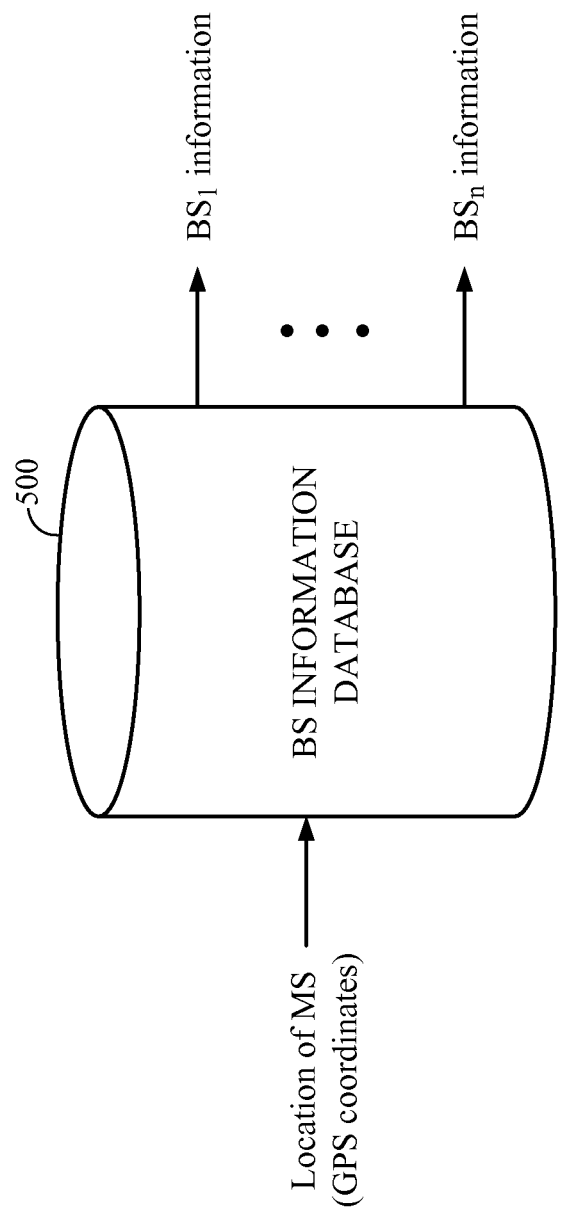
FIG. 5 illustrates a BS information database that may be accessed to obtain information about at least one BS by knowing the location (e.g., Global Positioning System (GPS) coordinates) of an MS, in accordance with certain embodiments of the present disclosure.

At 404, information about neighbor BSs may be retrieved from a BS information database 500 based on the location of the MS, as in FIG. 5. The BS information database 500 may reside within the MS (e.g., the MS may be manufactured and shipped for sale, already including the database 500), be broadcast periodically to the MS in an effort to update the MS's internal database, or be stored in the network operator's database to be provided upon request from the MS, for example. If the BS information database 500 is stored in the network operator's database, the MS may report its location (e.g., derived from an external GPS device) to the network (e.g., via a serving BS) and let the network query the BS information database and send information about neighbor BSs back to the MS through either Layer 3 (L3) or upper layer communication protocols.

In an effort to describe the location of the BSs with latitude and longitude, records in the database 500 may contain location information (e.g., GPS coordinates) of each BS 602, as in FIG. 6. The location 602 of the BSs may then be used as a search index such that the location of the MS may be utilized to quickly derive all of the BSs nearby (i.e., nearby BSs or neighbor BSs) through the static mapping provided by the database 500 because the location of each BS is almost never changed. In addition to location 602, the database 500 may include each BS's unique BS identification (BSID) 604 to distinguish the BSs. Furthermore, the database records may include any combination of fields with information suitable to characterize the BSs, notify the MS what parameters each of the BSs may support, and assist the MS in making decisions as to which of the nearby BSs may be better-suited candidates for network entry and initialization, scanning, and/or handover operations. As illustrated in FIG. 6, these information fields of the database 500 may include subscription privileges 606, the frequency 608, the frequency band (not shown), the standards releases of the protocols that each BS supports 610, and the BS's radio access technology (RAT) 612.

At 406, after the information about nearby BSs has been retrieved from the database 500, the information may be used to select one or more neighbor BS candidates for an MS to scan or handover. In other words, the information contained in the database fields may be used to narrow down the list of neighbor BSs near the MS based on location alone to a list of suitable neighbor BS candidates based on at least one BS information parameter provided in the database 500. After the one or more neighbor BS candidates have been identified, the MS may start the measurement process (e.g., scanning) on one or more of these designated BS candidates in an effort to further identify the most suitable BS for the MS to perform network entry or a handover, for example.

FIGS. 7-11 illustrate mobility scenarios where one or more neighbor BS candidates are selected for a user terminal 106, such as an MS, to scan or handover, with and without knowing the location of the MS 106. In FIGS. 7-11, the non-shaded BSs are included in the list of suitable neighbor BS candidates, while the shaded BSs are not included in the list for various reasons as discussed below.

Figure 7:
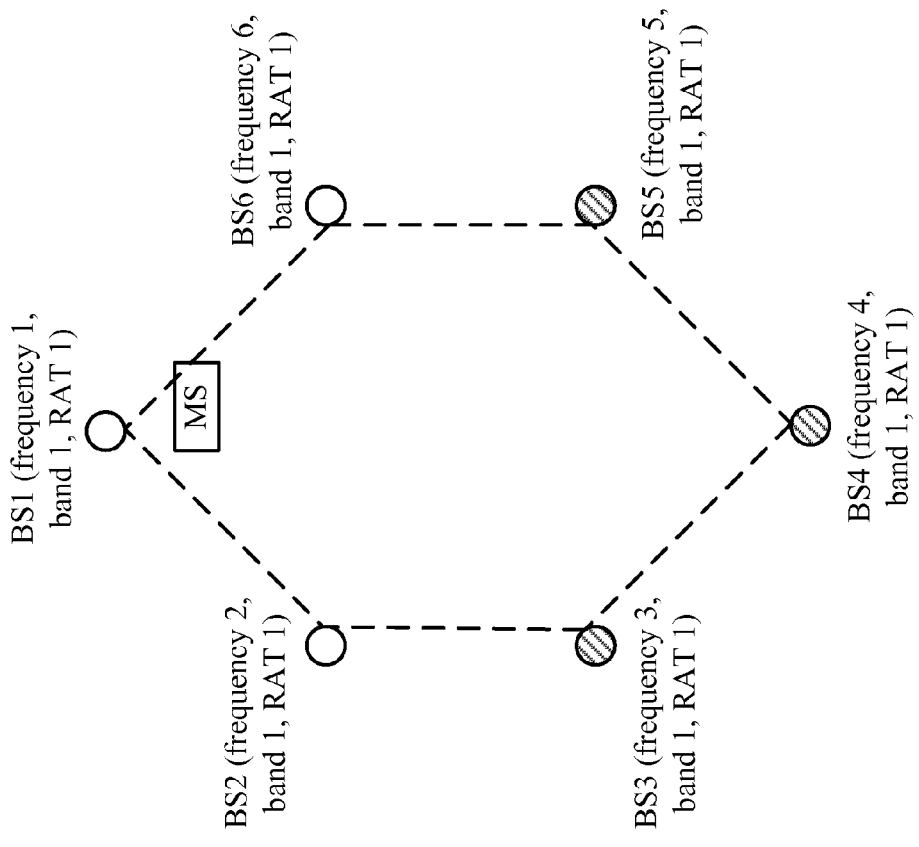
FIGS. 7-11 illustrate mobility scenarios where one or more neighbor BS candidates are selected for an MS to scan or handover, with and without knowing the location of the MS, in accordance with certain embodiments of the present disclosure.
Figure 7:
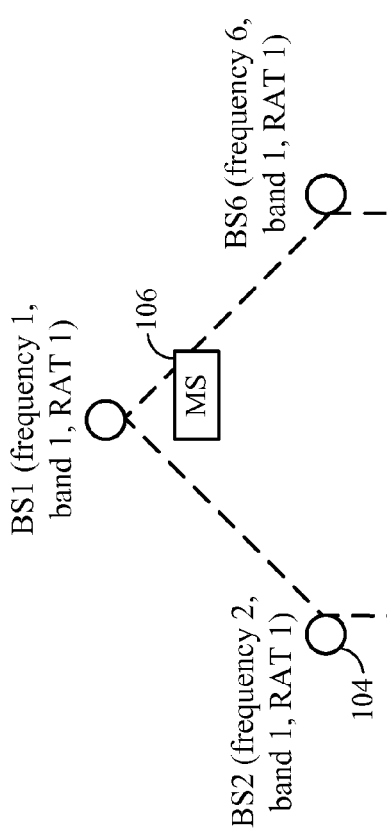

In FIG. 7, the frequency band and RAT are the same for all six BSs. Without GPS assistance, the list of suitable neighbor BS candidates may include all the neighbor BSs 104 (BS1-BS6). With GPS assistance, since the frequency band and RAT are the same for all six BSs, selection of the one or more neighbor BS candidates may be based solely on location. The location 602 of neighbor BSs may be used to determine which BSs are within a certain threshold distance of the MS. In FIG. 7, since BS1, BS2, and BS6 may be within a certain threshold distance of the MS, they are selected as neighbor BS candidates for scanning. Eliminating the total number of neighbor BS candidates for scanning may cut down the time in each measurement period and may increase the sleep window when the MS is in sleep mode.

Figure 8:
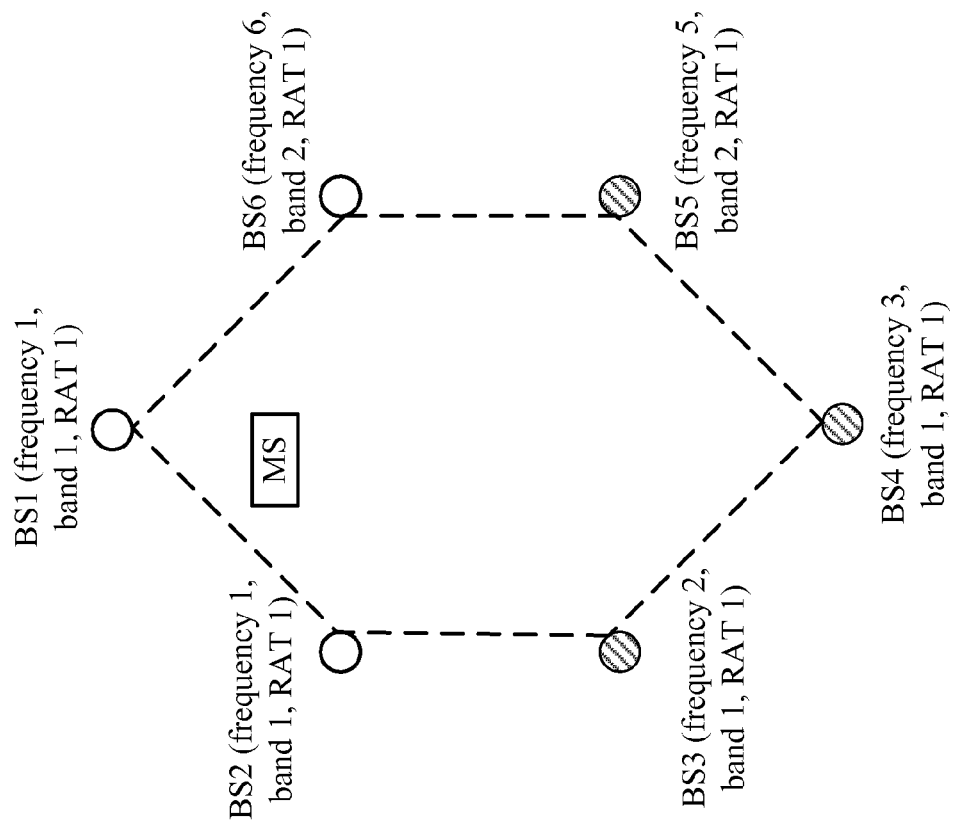
Figure 8:
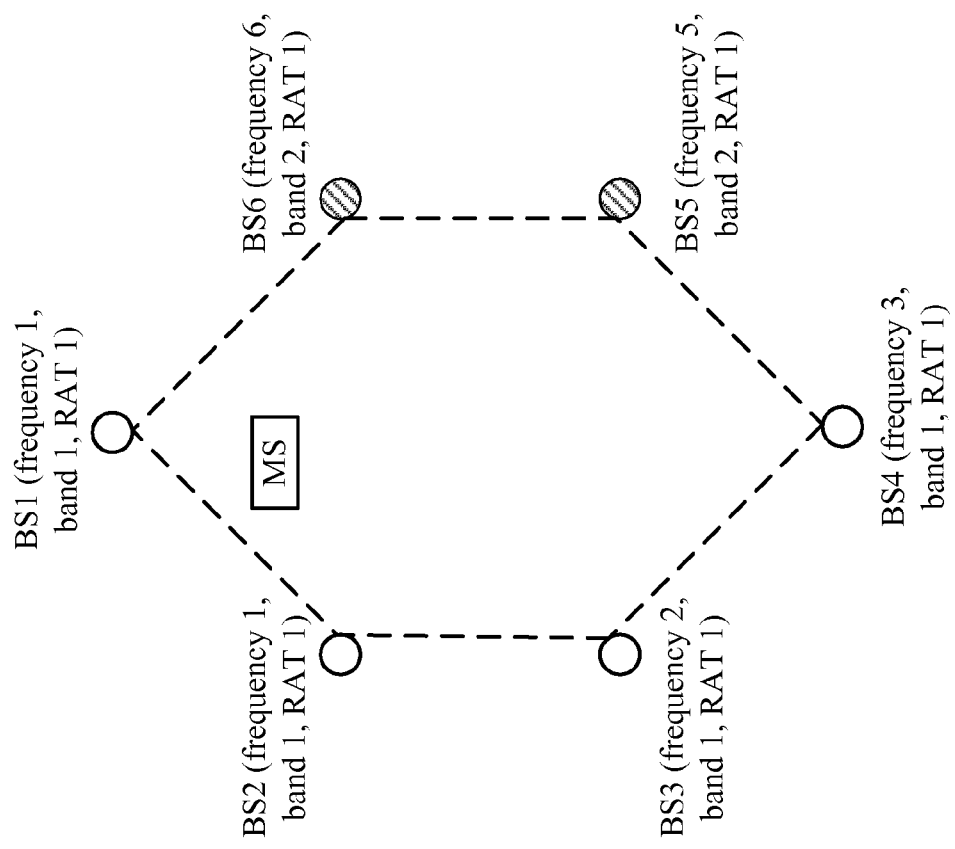

In FIG. 8, the RAT is the same for all six BSs but the frequency bands are different. Without GPS assistance, the cell selection or reselection process may favor the BSs falling into the same frequency band; as a result, assuming the MS is operating on a first band (band 1), BS5 or BS6 may not be selected as neighbor BS candidates since they are operating on a second band (band 2). With GPS assistance, as long as an MS can support different bands and frequencies, BS6 may be selected as a neighbor BS candidate, although this BS is operating on a different band, because BS6, as well as BS1 and BS2, may be within a certain threshold distance from the MS. BS5, as well as BS3 and BS4, may be beyond the threshold distance, so these BSs may not be included in the measurement process.

Figure 9:
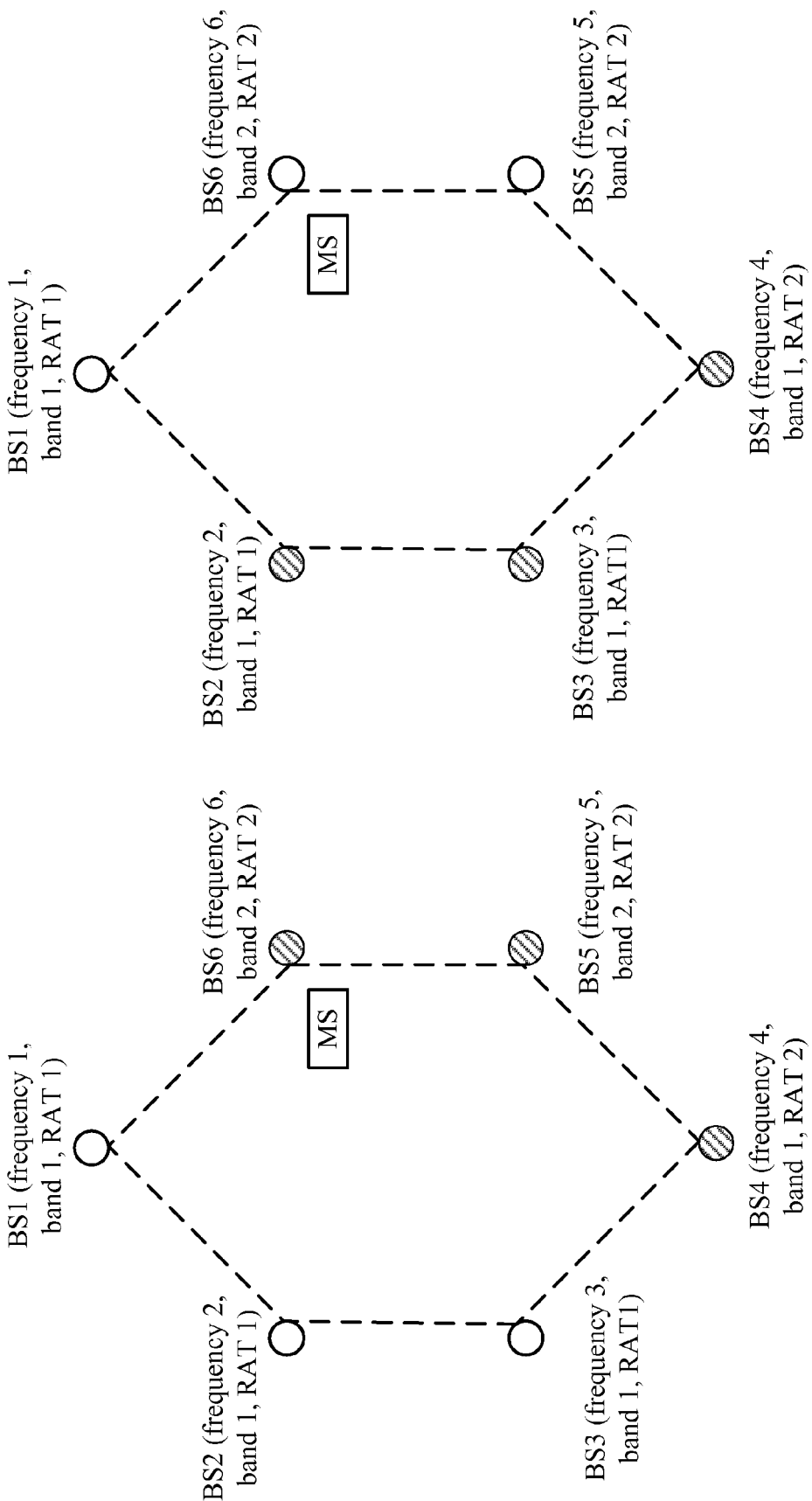

In FIG. 9, the frequency bands and RATs are different for all six BSs. Without GPS assistance, the cell selection or reselection process may favor the BSs operating with the same RAT. If the network currently supports single mode, then the network may only provide the neighbor BS information within the same RAT despite whether the MS may be able to support different RATs; as a result, assuming the MS is on a RAT 1 network, BS5 and BS6 may not be selected as neighbor BS candidates for scanning since they are RAT 2 BSs. With GPS assistance, since BS5 and BS6 may be within a threshold distance from the MS, they may be selected as neighbor BS candidates, irrespective of the different RAT networks. Using current technology, there may be no problem for the MS to identify a new BS whether it is in the same RAT or a different RAT. Although BS2 and BS3 are operating on RAT 1 networks as the MS is currently on, BS2 and BS3 may not be selected as neighbor BS candidates since they are beyond the threshold distance from the MS.

Figure 10:
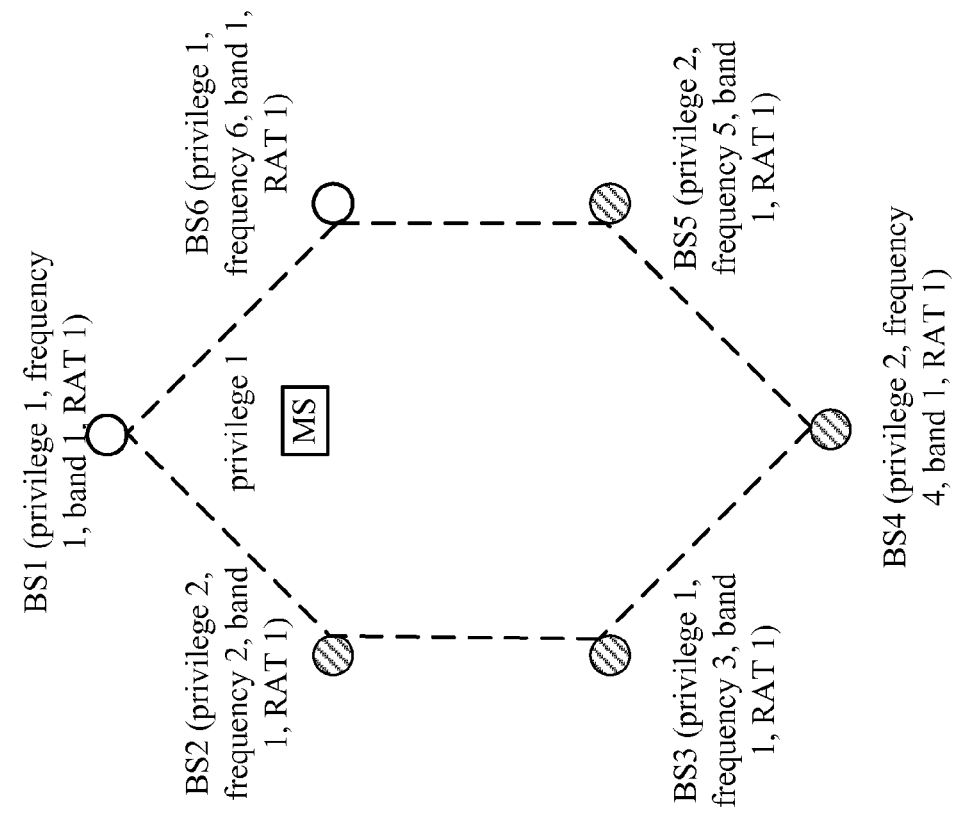
Figure 10:
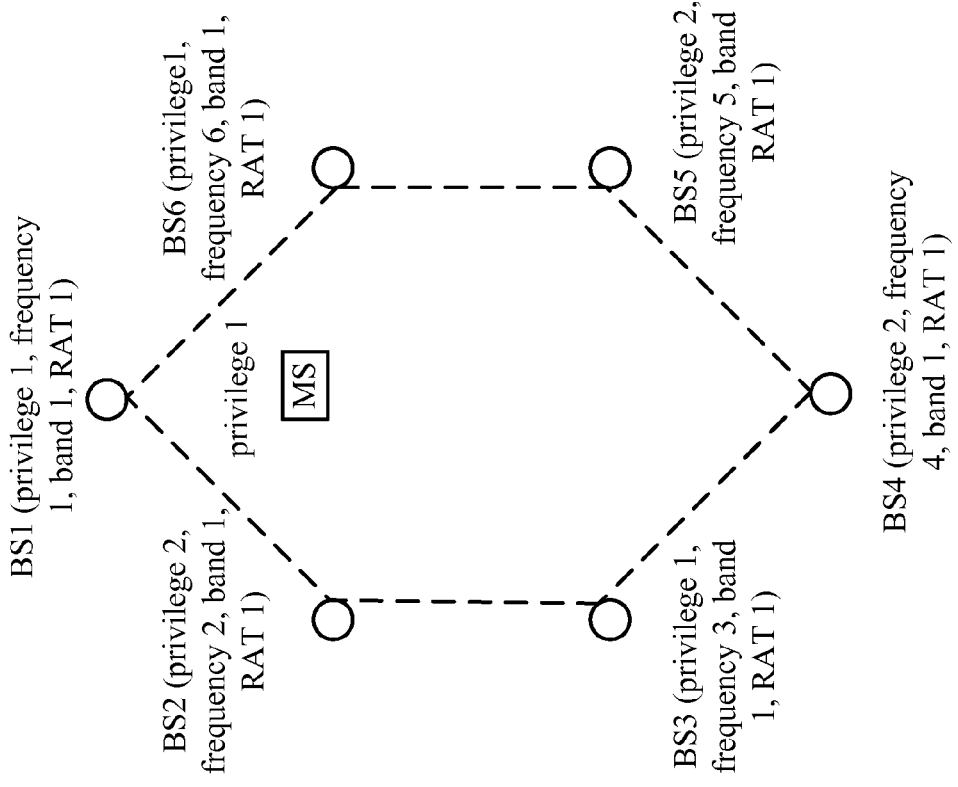

An MS may not be able to camp on a BS due to an unqualified privilege. In FIG. 10, without GPS assistance, the cell selection or reselection process may not provide the privilege information for neighbor BSs through the system broadcasting, so BS1-BS6 may be selected as suitable neighbor BS candidates despite the fact that camping on BS2, BS4, or BS5 may be rejected later because the MS was not offered privilege 2, for example. This feature may be crucial for an MS using the Subscriber Identity Module (SIM) card type of subscription services, which may sometimes force the MS to roll back to the previous camping BS due to an unqualified privilege. The MS may have to choose a new BS to camp on, which may increase the total successful handover transaction time significantly. With GPS assistance, after BS information is retrieved from the database 500 for neighbor BSs, the subscription privileges 606 offered by each neighbor BS may be used to determine which neighbor BSs the MS may have privilege to access; as a result, assuming the MS may be able to access neighbor BSs that offer privilege 1, BS2, BS4, and BS5 may be filtered from the neighbor BS candidates considered for scanning since these particular BSs offer privilege 2.

Figure 11:
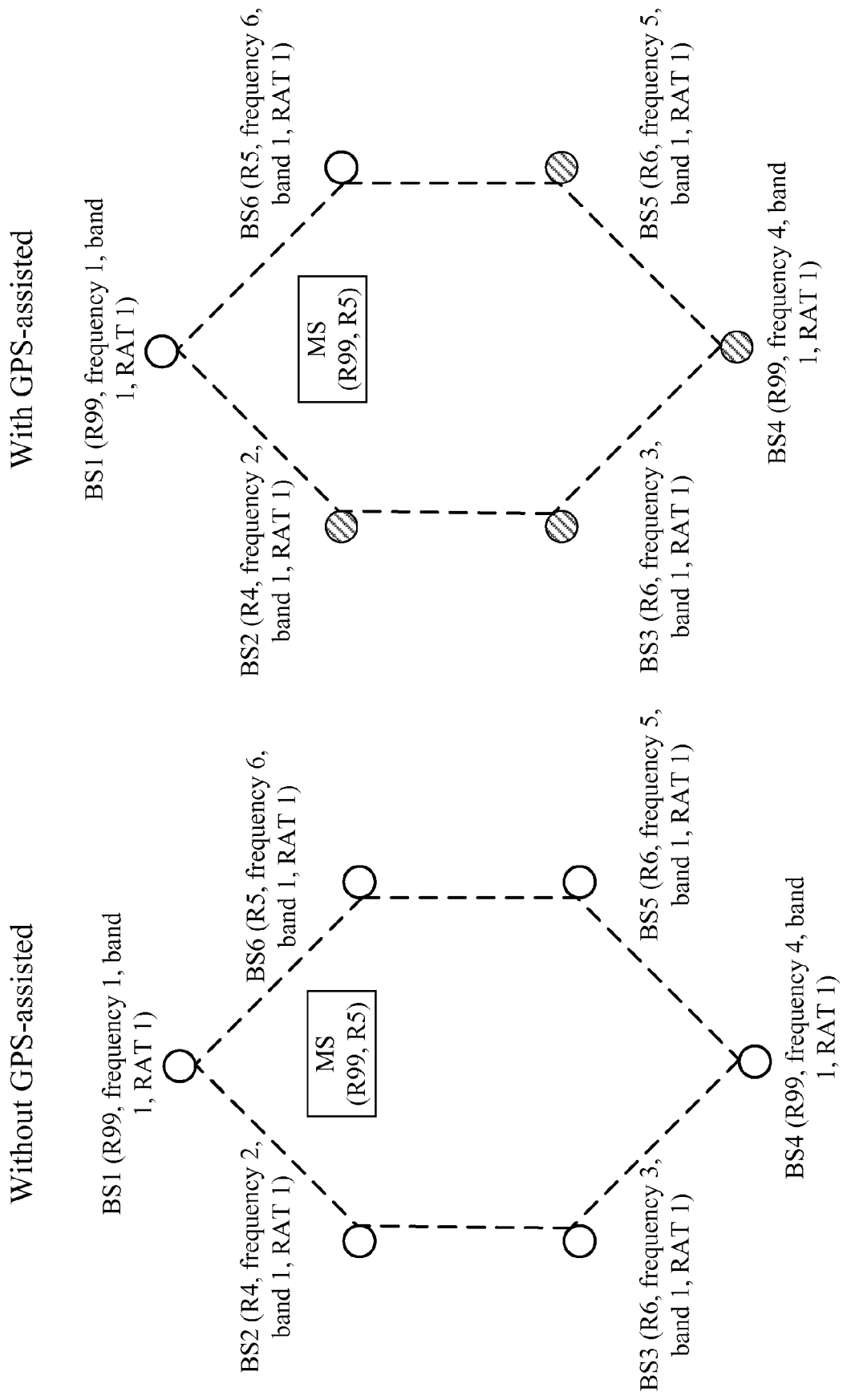

Similar to privileges, neighbor BSs with a standards release 610 that an MS cannot support are filtered from the neighbor BS candidates considered for the cell selection and reselection process. In FIG. 11, without GPS assistance, all neighbor BSs may be selected as neighbor BS candidates, although BS2, BS3, and BS5 may not be supported by the MS, which only supports standards releases R99 and R5 in this example. With GPS assistance, BS2, BS3, and BS5 may be filtered from the neighbor BS candidates considered for the measurement process since these particular BSs support different standards releases than the MS.

Figure 4A:
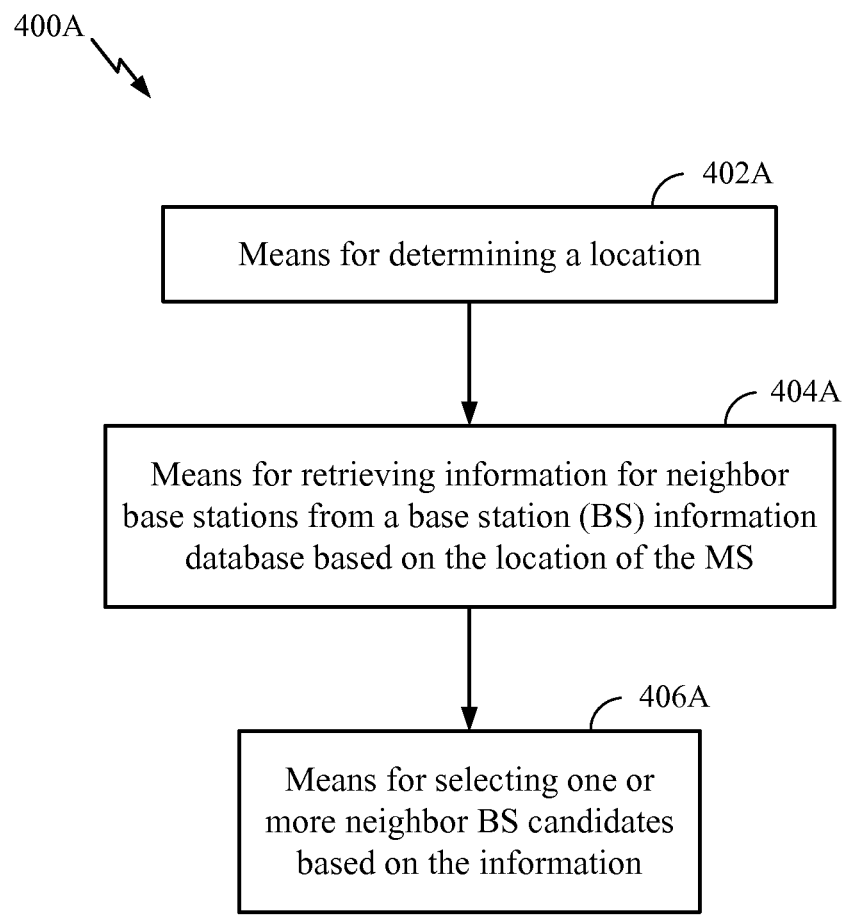
FIG. 4A is a block diagram of means corresponding to the example operations of FIG. 4 for determining one or more neighbor BS candidates for an MS to scan or handover, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 402-406 illustrated in FIG. 4 correspond to means-plus-function blocks 402A-406A illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for determining one or more neighbor base station (BS) candidates for a mobile station (MS) to scan for handover, comprising:
   determining, by the MS, a location of the MS;
   retrieving, by the MS based on the location as determined by the MS, information from a BS information database regarding a plurality of nearby base stations;
   based on the information, narrowing down the plurality of nearby base stations to a set of neighbor BS candidates having parameters the MS supports; and
   scanning a plurality of BS candidates in the set of neighbor BS candidates for handover.

2. The method of claim 1, wherein determining the location of the MS comprises determining the location using the Global Positioning System (GPS).

3. The method of claim 2, wherein determining the location of the MS comprises communicating with a GPS device external to the MS.

4. The method of claim 2, wherein the location of the MS comprises GPS coordinates.

5. The method of claim 1, wherein the BS information database is stored in the MS or is stored in a network operator's database.

6. The method of claim 1, further comprising:
   transmitting the location of the MS to one of the plurality of nearby base stations; and
   receiving the BS information database from the one of the plurality of nearby base stations.

7. The method of claim 1, further comprising:
   periodically receiving at least a portion of a network operator's BS information database; and
   updating at least a portion of the BS information database with the received network operator's BS information database, wherein the BS information database is maintained internal to the MS.

8. The method of claim 1, wherein retrieving information from the BS information database regarding the plurality of nearby base stations comprises:
   calculating distances between locations for a plurality of base stations and the location of the MS, wherein the locations for the plurality of base stations are provided in the BS information database; and
   grouping into the plurality of nearby base stations any of the plurality of base stations with a calculated distance to the location of the MS less than a threshold.

9. The method of claim 1, wherein the information comprises a location for each of the plurality of nearby base stations.

10. The method of claim 1, wherein the information retrieved from the BS information database comprises the parameters.

11. The method of claim 10, wherein the parameters comprise, for each of the plurality of nearby base stations, at least one of a BS identification (BSID), a subscription privilege, a frequency, a frequency band, a standards release, and a radio access technology (RAT).

12. A mobile device, comprising:
   memory; and
   a processor coupled to the memory, the processor configured to:
   detect, at the mobile device, a location of the mobile device;
   retrieve, by the mobile device based on the location detected at of the mobile device, information from a base station (BS) information database regarding a plurality of nearby base stations;
   narrow, based on the information, the plurality of nearby base stations to a set of neighbor BS candidates having parameters the mobile device supports; and
   scan a plurality of BS candidates in the set of neighbor BS candidates for handover.

13. The mobile device of claim 12, wherein the processor is further configured to determine the location using the Global Positioning System (GPS).

14. The mobile device of claim 13, wherein the processor is further configured to determine the location at least in part by communicating with a GPS device external to the mobile device.

15. The mobile device of claim 13, wherein the location of the mobile device comprises GPS coordinates.

16. The mobile device of claim 12, wherein the BS information database is stored in the mobile device or is stored in a network operator's database.

17. The mobile device of claim 12, further comprising:
a transmitter configured to transmit the location of the mobile device to one of the plurality of nearby base stations; and
a receiver configured to receive the BS information database from the one of the plurality of nearby base stations.

18. The mobile device of claim 12, further comprising
a receiver configured to periodically receive at least a portion of a network operator's BS information database, and
wherein the processor is further configured to update at least a portion of the BS information database with the received network operator's BS information database, wherein the BS information database is maintained internal to the mobile device.

19. The mobile device of claim 12, wherein the processor is further configured to:
calculate distances between locations for a plurality of base stations and the location of the mobile device, wherein the locations for the plurality of base stations are provided in the BS information database; and
group into the plurality of nearby base stations any of the plurality of base stations with a calculated distance to the location of the mobile device less than a threshold.

20. The mobile device of claim 12, wherein the information comprises a location for each of the plurality of nearby base stations.

21. The mobile device of claim 12, wherein the information retrieved from the BS information database comprises the parameters.

22. The mobile device of claim 21, wherein the parameters comprise, for each of the plurality of nearby base stations, at least one of a BS identification (BSID), a subscription privilege, a frequency, a frequency band, a standards release, and a radio access technology (RAT).

23. An apparatus for wireless communications, comprising:
means for determining, at the apparatus, a location of the apparatus;
means for retrieving, by the apparatus and based on the location determined at of the apparatus, information from a base station (BS) information database regarding a plurality of nearby base stations;
means for narrowing down, based on the information, the plurality of nearby base stations to a set of neighbor BS candidates having parameters the apparatus supports; and
means for scanning a plurality of BS candidates in the set of neighbor BS candidates for handover.

24. The apparatus of claim 23, wherein the means for determining the location of the apparatus determines the location using the Global Positioning System (GPS).

25. The apparatus of claim 24, wherein the means for determining the location of the apparatus comprises means for communicating with a GPS device external to the apparatus.

26. The apparatus of claim 24, wherein the location of the apparatus comprises GPS coordinates.

27. The apparatus of claim 23, wherein the BS information database is stored in the apparatus or is stored in a network operator's database.

28. The apparatus of claim 23, further comprising:
means for transmitting the location of the apparatus to one of the plurality of nearby base stations; and
means for receiving the BS information database from the one of the plurality of nearby base stations.

29. The apparatus of claim 23, further comprising:
means for periodically receiving at least a portion of a network operator's BS information database; and
means for updating at least a portion of the BS information database with the received network operator's BS information database, wherein the BS information database is maintained internal to the apparatus.

30. The apparatus of claim 23, wherein the means for retrieving information from the BS information database regarding the plurality of nearby base stations comprises:
means for calculating distances between locations for a plurality of base stations and the location of the apparatus, wherein the locations for the plurality of base stations are provided in the BS information database; and
means for grouping into the plurality of nearby base stations any of the plurality of base stations with a calculated distance to the location of the apparatus less than a threshold.

31. The apparatus of claim 23, wherein the information comprises a location for each of the plurality of nearby base stations.

32. The apparatus of claim 23, wherein the information retrieved from the BS information database comprises the parameters.

33. The apparatus of claim 32, wherein the parameters comprise, for each of the plurality of nearby base stations, at least one of a BS identification (BSID), a subscription privilege, a frequency, a frequency band, a standards release, and a radio access technology (RAT).

34. A computer-program product for determining one or more neighbor base station (BS) candidates for a mobile station (MS) to scan or handover, comprising a non-transitory computer-readable medium having instructions stored thereon, the instructions being executable by one or more processors and the instructions comprising:
instructions for detecting, at the MS, a location of the MS;
instructions for retrieving, by the MS and based on the location determined by of the MS, information from a BS information database regarding the plurality of nearby base stations;
instructions for narrowing down, based on the information, the plurality of nearby base stations to a set of neighbor BS candidates having parameters the MS supports; and
instructions for scanning a plurality of BS candidates in the set of neighbor BS candidates for handover.

35. The computer-program product of claim 34, wherein the instructions for determining the location of the MS comprise instructions for determining the location using the Global Positioning System (GPS).

36. The computer-program product of claim 35, wherein the instructions for determining the location of the MS comprise instructions for communicating with a GPS device external to the MS.

37. The computer-program product of claim 35, wherein the location of the MS comprises GPS coordinates.

38. The computer-program product of claim 34, wherein the BS information database is stored in the MS or is stored in a network operator's database.

39. The computer-program product of claim 34, further comprising:
   instructions for transmitting the location of the MS to one of the plurality of nearby base stations; and
   instructions for receiving the BS information database from the one of the plurality of nearby base stations.

40. The computer-program product of claim 34, further comprising:
   instructions for periodically receiving at least a portion of a network operator's BS information database; and
   instructions for updating at least a portion of the BS information database with the received network operator's BS information database, wherein the BS information database is maintained internal to the MS.

41. The computer-program product of claim 34, wherein the instructions for retrieving information from the BS information database regarding the plurality of nearby base stations comprise:
   instructions for calculating distances between locations for a plurality of base stations and the location of the MS, wherein the locations for the plurality of base stations are provided in the BS information database; and
   instructions for grouping into the plurality of nearby base stations any of the plurality of base stations with a calculated distance to the location of the MS less than a threshold.

42. The computer-program product of claim 34, wherein the information comprises a location for each of the plurality of nearby base stations.

43. The computer-program product of claim 34, wherein the information retrieved from the BS information database comprises the parameters.

44. The computer-program product of claim 43, wherein the parameters comprise, for each of the plurality of nearby base stations, at least one of a BS identification (BSID), a subscription privilege, a frequency, a frequency band, a standards release, and a radio access technology (RAT).

* * * * *